April 7, 1959 G. W. GILMORE 2,880,827
PORTABLE LOGGING SPAR APPARATUS
Filed Nov. 25, 1955 2 Sheets-Sheet 1
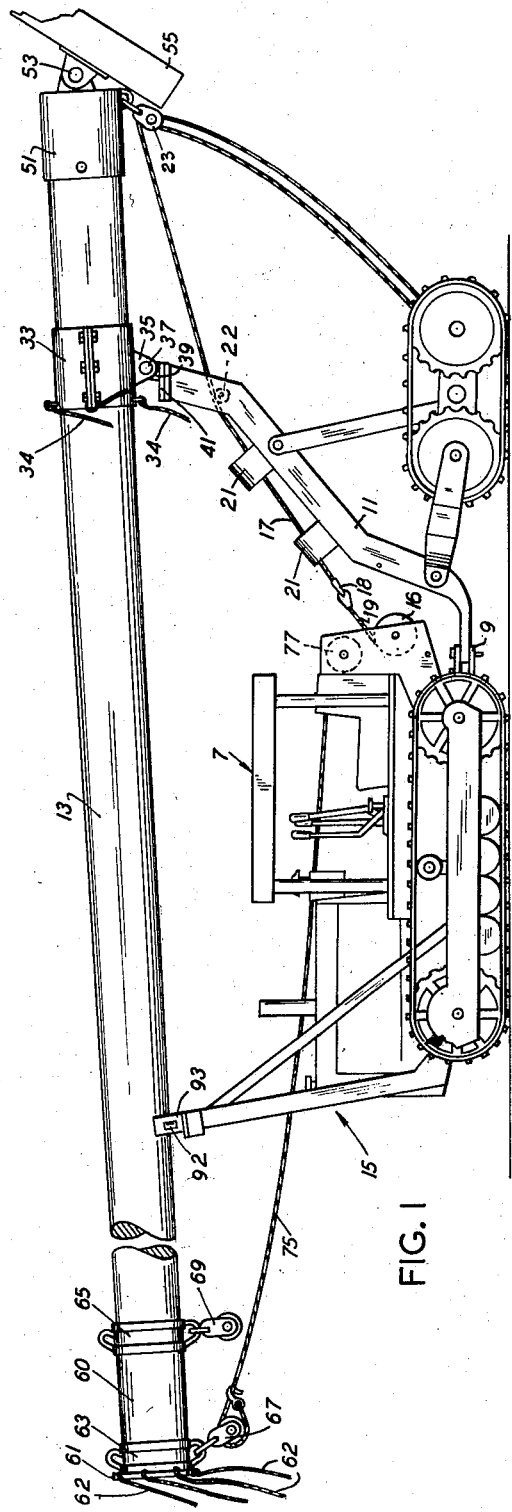
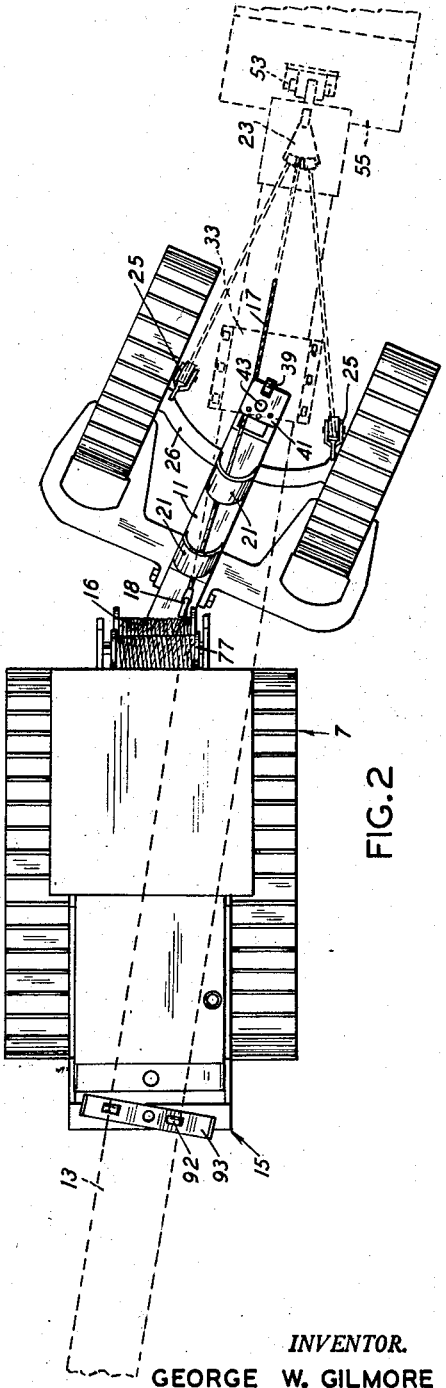
INVENTOR.
GEORGE W. GILMORE
BY
*Buckhorn and Cheatham*
ATTORNEYS April 7, 1959

G. W. GILMORE 2,880,827

PORTABLE LOGGING SPAR APPARATUS

Filed Nov. 25, 1955

INVENTOR.
GEORGE W. GILMORE
BY
Buckhorn and Cheatham
ATTORNEYS

2,880,827

PORTABLE LOGGING SPAR APPARATUS

George W. Gilmore, Molalla, Oreg.

Application November 25, 1955, Serial No. 548,918

7 Claims. (Cl. 189—11)

This invention relates to portable logging spar apparatus of the type in which a spar is mounted on vehicular means for transportation from place to place.

It is the main object of the present invention to provide an apparatus of the above type which is more compact in its transporting condition than prior similar apparatus and which is more readily maneuvered than prior apparatus.

Another object of the present invention is to provide a portable spar apparatus including a spar so mounted on a carrying vehicle that when the spar is in its erected position it may rest on the ground surface.

A further object of the present invention is to provide an apparatus of the character under consideration having a simple but effective arrangement for erecting a spar from a horizontal inoperative position to a vertical operative position.

A still further object of the present invention is to provide a portable spar apparatus which is simpler, less complicated and less expensive than prior apparatus.

Another object of the present invention is to provide an apparatus of the character under consideration which includes conventional vehicles as major components.

The apparatus of the present invention is characterized by including a powered vehicle drawing a trailer vehicle, there being a spar supported by the vehicles in a horizontal inoperative position overlying both vehicles and having a base portion pivotally mounted on the trailer vehicle to provide for erection of said spar from its horizontal position to a vertical position rearwardly of the vehicles.

Various other objects of the present invention will be apparent from the following description taken in connection with the accompanying drawings wherein:

Fig. 1 is a side elevational view of an apparatus of the present invention showing the spar in its carrying position;

Fig. 2 is a plan view of the apparatus, showing the positions the parts occupy in making a turn, the spar being shown in broken lines for convenience in illustration;

Figure 4:
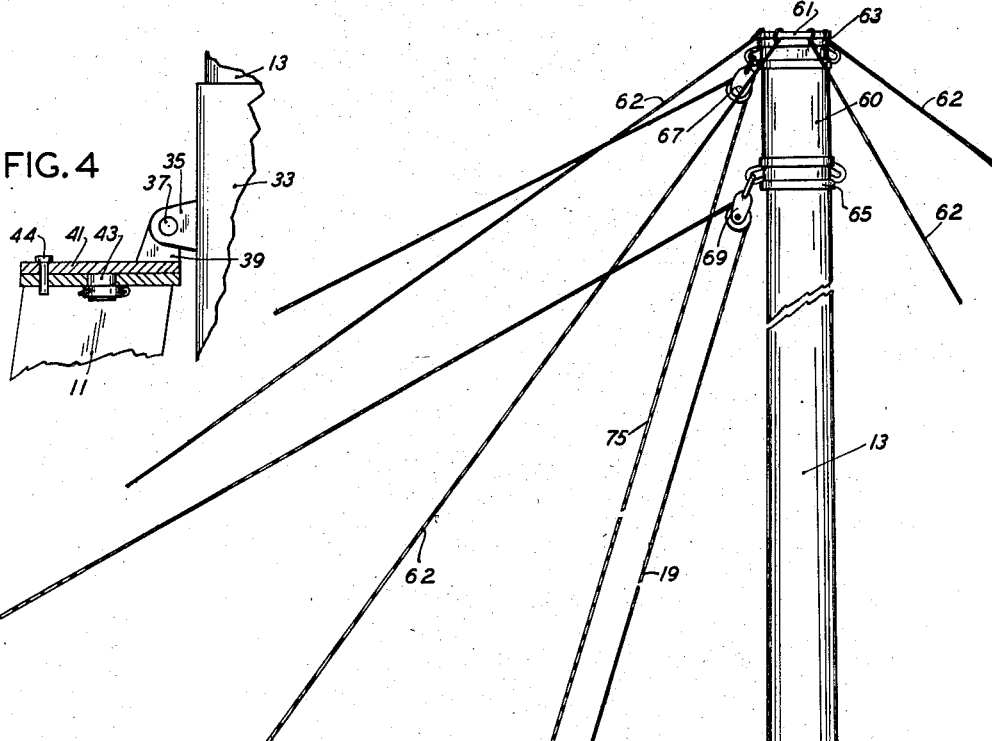
Fig. 4 is an enlarged fragmentary view, with parts broken away, showing more fully the manner of mounting the spar on the trailer vehicle.

Referring to Fig. 1 of the accompanying drawings, a conventional powered vehicle 7 in the form of a crawler tractor is connected by a vertical pivot pin hitch means 9 to the front lower end of the boom 11 of a trailer vehicle of which the major components may be those of a conventional logging arch. A spar unit, including a spar 13, is mounted in a manner to be presently more fully explained at its base portion on the rear upper end of the boom 11 for movement from the horizontal inoperative position shown in Fig. 1 to the vertical operative position shown in Fig. 3. In its horizontal position, the spar is jointly supported by the boom 11 and by a rest device 15 fixed to the frame of the tractor 7.

Spar 13 is adapted to be erected by the operation of mechanism including a power driven main line winch drum 16 on the rear end of the tractor 7. The winch drum has a spar erecting line 17 detachably coupled at 18 to a main line 19. The line 17 extends through guides 21 and a roller type fairlead 22 on the boom 11, and then is reeved back and forth between a block unit 23 carried by the base end of the spar and a pair of block units 25 (Fig. 2) carried by the frame 26 of the arch. The free end of the line 17 is anchored to one of the block units.

The spar 13 preferably comprises a single piece of timber having a split collar 33 clamped therearound adjacent but spaced from the base end. The collar has lower guy lines 34 attached thereto and carries a clevis 35 (Fig. 4) receiving a horizontal pivot pin 37 which extends through an eye member 39 between the portions of the clevis, the eye member being fixed to a disk 41. The disk is mounted for rotary movement by means of a vertical pin 43 journaled on the upper rear end of the boom 11. Thus, the spar is mounted for swinging or pivoting movement about a horizontal axis provided by pivot pin 37, and for turning or swinging movement about a vertical axis provided by pivot pin 43. The disk 41 may, however, be locked in selected positions by a pin 44 extending through aligned bores in the disk and the upper end of the boom 11.

The spar unit extends rearwardly of the pivot pin 37, that is, in a direction away from the tractor 7, a sufficient distance to engage the ground surface when the spar is in its erect position. For properly engaging the ground surface, the spar 13 has a base fitting 51 which is pivotally connected at 53 to a base block 55. Thus the base block is self-adjusting for proper engagement with the ground surface.

At its top end, spar 13 has fixed thereto a metal spar cap 60 having a top flange 61 provided with holes to permit guy lines 62 to be secured to the flange. Below the flange, the spar cap is provided with an upper revolving band 63 and a lower revolving band 65 carrying blocks 67 and 69, respectively. Reeved through block 67 is the haul back line 75 which is wound about a haul back drum 77 on the tractor 7.

The particular cable hauling system disclosed in the drawings is a high lead system in which the free ends of the main line and the haul back line will be secured together in conventional fashion during yarding operations. The invention, however, is not intended to be limited to any particular cable hauling system.

In the lowered or horizontal carrying position of the spar 13, it is apparent that the apparatus of the present invention is very compact because the spar overlies both the arch 11 and the tractor 7. Furthermore, the apparatus can readily be maneuvered when driven because the pivot pin 43 allows the spar to swing in a horizontal plane relative to the arch (Fig. 2) so that the spar does not interfere with turning movement of the tractor 7 relative to the arch 11. During turning movement of the tractor 7 relative to the arch 11, there will be a slight axial shifting movement of the spar 13 relative to the rest 17, as is evident from Fig. 2. The rest is shown as being equipped with rollers 92 (Fig. 2) readily to permit such axial shifting movement, and furthermore the rest preferably includes a Y-shaped member 93 mounted to pivot about a vertical axis and carrying rollers 92. This maneuverability of the apparatus is very important in mountainous areas where the roads are narrow and winding.

The guy lines 62 may be detached when transporting the spar from place to place, may be stored on the apparatus, or they may be arranged over the tractor and by the arch and allowed to trail along the ground.

To erect the spar, the arch and tractor are arranged in alignment so that pin 44 may be inserted to lock the disk 41. A pair of bars 94 (Fig. 3) are preferably connected between the boom 11 and the tractor frame to prevent pivoting of the arch relative to the tractor during erection of the spar. The main drum 16 is then driven to reel in line 17 and thus draw the base end of the spar downwardly and pivot the spar in a clockwise direction to the Fig. 3 position. The upper guy lines 62 and lower guy lines 34 are now positioned, and the main line 19 uncoupled from erecting line 17 and reeved through block 69. The haul back line 75 is reeved through corner and main blocks (not shown) and its end connected to the end of the main line 19 for high lead logging.

Figure 3:
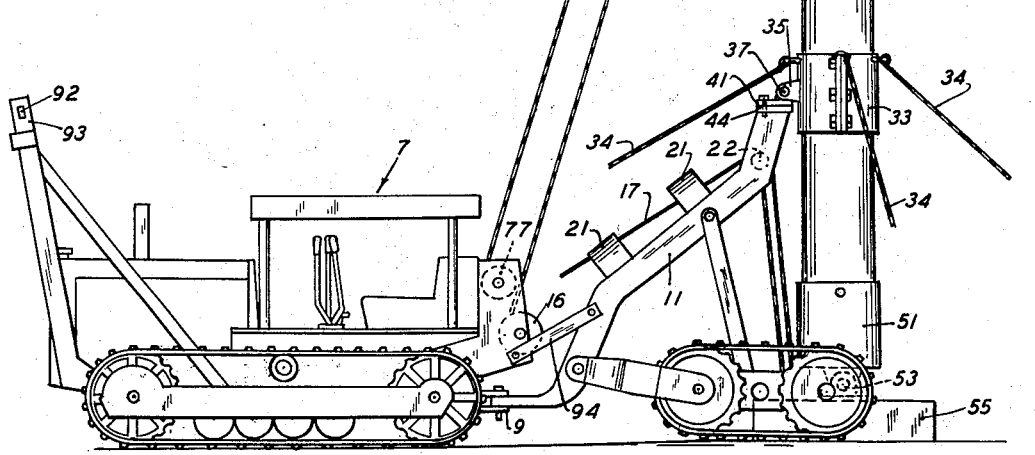
Fig. 3 is a side elevational view of the apparatus showing the spar erected.

To lower the spar from its erected position shown in Fig. 3 to the horizontal carrying position shown in Fig. 1, the main line 19 is once again connected to line 17 and all the guy lines released except for one extending forwardly. The tractor is then slowly backed up to force the spar to pivot counterclockwise as the parts are shown in Fig. 3. Drum 16 is operated to slowly reel out the line 19 to control the lowering movement of the spar under the influence of gravity.

Having described the invention in what is considered to be the preferred embodiment thereof, it is desired that it be understood that the invention is not to be limited other than by the provisions of the following claims.

I claim:

1. In combination, a crawler tractor, a logging arch connected to the rear end of said tractor by a hitch providing for relative pivotal movement between the tractor and the arch about a vertical axis, a spar extending lengthwise of and overlying said tractor and arch and being pivotally connected adjacent its base end to said arch for movement from a horizontal carrying position to a vertical operative position generally behind said arch with the base end of said spar resting on the ground or equivalent supporting surface, rest means on said tractor supporting said spar in spaced relation from the front end of said spar, a winch on the rear end of said tractor for raising said spar, and means for releasably locking said tractor and arch against pivotal movement relative to one another during erection of said spar.

2. In combination, a crawler tractor, a logging arch connected to the rear end of said tractor by a hitch providing for relative pivotal movement between the tractor and the arch about a vertical axis, a spar extending lengthwise of and overlying said tractor and arch and being pivotally connected adjacent its base end to said arch for movement from a horizontal carrying position to a vertical operative position generally behind said arch with the base end of said spar resting on the ground or equivalent supporting surface, rest means on said tractor supporting said spar in spaced relation from the front end of said spar, a winch on the rear end of said tractor for raising said spar, and means for releasably locking said tractor and arch in alignment with one another and against pivotal movement relative to one another during erection of said spar.

3. In combination, a crawler tractor, a logging arch connected to the rear end of said tractor by a hitch providing for relative pivotal movement between the tractor and the arch about a vertical axis, a spar extending lengthwise of and overlying said tractor and arch and being pivotally connected adjacent its base end to said arch for movement from a horizontal carrying position to a vertical operative position generally behind said arch with the base end of said spar resting on the ground or equivalent supporting surface, rest means on said tractor supporting said spar in spaced relation from the front end of said spar, a winch on the rear end of said tractor for raising said spar, said winch having a cable extending to the base end of said spar and then to the arch at a place substantially below the pivotal axis of said spar so that said winch may readily erect said spar with a minimum strain on said cable.

4. In combination, a crawler tractor, a logging arch connected to the rear end of said tractor by a hitch providing for relative pivotal movement between the tractor and the arch about a vertical axis, a spar extending lengthwise of and overlying said tractor and arch and being pivotally connected adjacent its base end to said arch for movement from a horizontal carrying position to a vertical operative position generally behind said arch with the base end of said spar resting on the ground or equivalent supporting surface, rest means on said tractor supporting said spar in spaced relation from the front end of said spar, a winch on the rear end of said tractor for raising said spar, said winch having a cable extending to the base end of said spar and then to the arch at a place substantially below the pivotal axis of said spar so that said winch may readily erect said spar with a minimum strain on said cable, said cable being reeved back and forth between said spar and arch a plurality of times to provide a substantial mechanical advantage in raising said spar.

5. In combination, a crawler tractor, a logging arch connected to the rear end of said tractor by a hitch providing for relative pivotal movement between the tractor and the arch about a vertical axis, a spar extending lengthwise of and overlying said tractor and arch and being pivotally connected adjacent its base end to said arch for movement from a horizontal carrying position to a vertical operative position generally behind said arch with the base end of said spar resting on the ground or equivalent supporting surface, rest means on said tractor supporting said spar in spaced relation from the front end of said spar, a winch on the rear end of said tractor for raising said spar, said winch having a cable extending to the base end of said spar at a point rearwardly of the pivotal axis of said spar, and cable guide means on said arch guiding said cable lengthwise of said arch from said winch to said base end of said spar.

6. In combination, a crawler tractor, a logging arch connected to the rear end of said tractor by a hitch providing for relative pivotal movement between the tractor and the arch about a vertical axis, a spar extending lengthwise of and overlying said tractor and arch and being pivotally connected adjacent its base end to said arch for movement from a horizontal carrying position to a vertical operative position generally behind said arch with the base end of said spar resting on the group or equivalent supporting surface, rest means on said tractor supporting said spar in spaced relation from the front end of said spar, a winch on the rear end of said tractor for raising said spar, the pivotal axis of said spar being approximately symmetrically disposed relative to the traction unit of said arch considered in a direction longitudinally of said arch so that said spar will not tend to tip said arch rearwardly when said spar is disposed in a vertical or substantially vertical position, said arch providing a space extending forwardly from the rear end of said arch and between the traction units of said arch to accommodate the base end of said spar when said spar is erected.

7. In combination, a crawler tractor, a logging arch connected to the rear end of said tractor by a hitch providing for relative pivotal movement between the tractor and arch about a vertical axis, a spar extending lengthwise of and overlying said tractor and arch and extending forwardly of said tractor so that its front end may be viewed by the operator of the tractor when manipulating the rig along winding, mountainous roads, pivot means connecting said spar adjacent its base end to said arch and providing for pivotal movement of said spar from a horizontal carrying position to a vertical operative position generally behind said arch with the base end of said spar resting on the ground or equivalent supporting surface, rest means fixed to the front end of said tractor and supporting said spar in spaced relation from the front end of said spar, said pivot means providing for pivotal movement of said spar when in its rest position about a vertical axis to facilitate pivotal movement between said tractor and arch, said rest means movably engaging said spar to provide for endwise movement of said spar relative to said tractor upon turning movement of said tractor relative to said arch, and means for erecting said spar.

References Cited in the file of this patent

UNITED STATES PATENTS

| | | |
|---|---|---|
| 1,212,232 | La Croix | Jan. 16, 1917 |
| 2,128,712 | Neff | Aug. 30, 1938 |
| 2,354,922 | McEwen et al. | Aug. 1, 1944 |
| 2,520,776 | Page | Aug. 29, 1950 |
| 2,595,307 | Selberg | May 6, 1952 |
| 2,711,803 | Hurst | June 28, 1955 |